US008696304B2

(12) United States Patent
Elliott et al.

(10) Patent No.: US 8,696,304 B2
(45) Date of Patent: Apr. 15, 2014

(54) TURBINE DISK AND BLADE ARRANGEMENT

(75) Inventors: Robert Elliott, Derby (GB); Benjamin J. Meyer, Colchester (GB)

(73) Assignee: Rolls-Royce PLC, London (GB)

( * ) Notice: Subject to any disclaimer, the term of this patent is extended or adjusted under 35 U.S.C. 154(b) by 487 days.

(21) Appl. No.: 13/022,034

(22) Filed: Feb. 7, 2011

(65) Prior Publication Data
US 2011/0200448 A1    Aug. 18, 2011

(30) Foreign Application Priority Data
Feb. 17, 2010    (GB) .................................... 1002679.7

(51) Int. Cl.
F01D 5/30    (2006.01)

(52) U.S. Cl.
USPC ..................... 415/115; 416/219 R; 416/90 R

(58) Field of Classification Search
USPC ........ 416/219 R, 220 R, 221, 90 R, 95, 96 R, 416/97 R; 415/115
See application file for complete search history.

(56) References Cited

U.S. PATENT DOCUMENTS

| | | | | |
|---|---|---|---|---|
| 3,501,249 | A * | 3/1970 | Scalzo et al. | 416/95 |
| 4,648,799 | A | 3/1987 | Brown et al. | |
| 5,795,659 | A * | 8/1998 | Meelu et al. | 428/610 |
| 6,416,282 | B1 * | 7/2002 | Beeck et al. | 416/97 R |
| 6,971,852 | B2 * | 12/2005 | Phipps et al. | 416/1 |
| 7,207,776 | B2 * | 4/2007 | Townes et al. | 416/95 |
| 2004/0191067 | A1 | 9/2004 | Phipps et al. | |
| 2005/0232751 | A1 | 10/2005 | Townes et al. | |

FOREIGN PATENT DOCUMENTS

| | | |
|---|---|---|
| DE | 1 076 446 | 2/1960 |
| GB | 631152 | 10/1949 |
| GB | 1 209 419 | 10/1970 |
| GB | 2 151 714 A | 7/1985 |
| GB | 1 605 282 | 12/1987 |

OTHER PUBLICATIONS

British Search Report issued in British Patent Application No. GB1002679.7 on May 26, 2010.
Jul. 2, 2013 European Search Report issued in European Application No. 11 15 3490.

* cited by examiner

*Primary Examiner* — Edward Look
*Assistant Examiner* — William Grigos
(74) *Attorney, Agent, or Firm* — Oliff PLC

(57) ABSTRACT

A turbine disk and blade arrangement having a plurality of turbine blades mounted circumferentially around a disk. Each blade has a fir tree root which provides a series of fore-to-aft-extending projections and grooves. The disk has a plurality of radially extending posts which define fir tree recesses therebetween. Each fir tree recess also provides a series of fore-to-aft-extending projections and grooves allowing each fir tree root to engage with a respective fir tree recess. On each pair of facing sides of the fir tree root and the fir tree recess, one or more projections of the fir tree roots and/or the fir tree recesses are truncated to form fore-to-aft-extending cooling passages. The arrangement has lock plates which cover forward and/or rearward surfaces of the posts and of the fir tree roots and define feed channels therebetween which feed cooling air to the respective cooling passage.

11 Claims, 3 Drawing Sheets

TURBINE DISK AND BLADE ARRANGEMENT

FIELD OF THE INVENTION

The present invention relates to a turbine disk and blade arrangement.

BACKGROUND OF THE INVENTION

In gas turbine engines, it is well known to connect turbine blades to turbine disks using "fir tree" connections. In such connections, each blade has a fir tree root which tapers inwardly in width with increasing inwards radial distance, the root being slidably insertable, along a substantially axial direction of the engine, into a respective conforming fir tree recess formed in the disk. The facing sides of the fir tree root and fir tree recess have respective interengaging serrations which take the form of projections and grooves extending in the direction of insertion of the root into the recess. In this way, the blades can be prevented from flying outwardly from the disk during operation of the engine.

It is also known to provide a space between the radially inward end of the blade root and the bottom of the recess so that cooling air, bled from the compressor, can be fed into the space, and from thence along interior channels in the blade, to cool the blade airfoil.

Although, such airfoil cooling can be effective, there still remains a problem of cooling the fir tree roots and the posts which extend radially from the disk to define the fir tree recesses therebetween.

To improve cooling in these regions, U.S. 2004/0191067 proposes truncating some of the fir tree projections to form cooling air flow paths extending from the front to the rear of the disk, and to supply such flow paths with cooling air bled from the compressor. In particular, U.S. 2004/0191067 proposes positioning a flange which covers the fir tree engaging features but is spaced therefrom so as to allow entry of cooling air via the space into the forward ends of the flow paths.

SUMMARY OF THE INVENTION

However, there remains a need to further improve the cooling of the fir tree roots and the posts.

Accordingly, a first aspect of the present invention provides a turbine disk and blade arrangement for a gas turbine engine in which a plurality of turbine blades are mounted is circumferentially around a disk, each blade having a fir tree root which provides on circumferentially spaced sides thereof a series of fore-to-aft-extending projections and grooves, and the disk having a plurality of circumferentially spaced, radially extending posts which define fir tree recesses therebetween, each fir tree recess also providing on circumferentially spaced sides thereof a series of fore-to-aft-extending projections and grooves, each fir tree root being slidable into a respective fir tree recess with the projections and grooves on facing sides of the fir tree root and the fir tree recess interengaging with each other;
wherein:
on each pair of facing sides of the fir tree root and the fir tree recess, one or more of the projections of the fir tree roots and/or the fir tree recesses are truncated to form fore-to-aft-extending cooling passages between facing sides of the fir tree roots and fir tree recesses, and
the arrangement has first lock plates which cover forward surfaces of the posts and of the fir tree roots and/or cover rearward surfaces of the posts and of the fir tree roots, the first lock plates and the posts defining feed channels therebetween which feed cooling air to the cooling passages, each cooling passage extending to a respective feed channel.

Thus by means of the feed channels, cooling air can be directed specifically to the cooling passages, rather than generally to a space in front of the fir tree engaging features. This allows the cooling air to be used more efficiently. Also, by appropriate sizing of the feed channels, cooling air can be directed preferentially to certain cooling passages, e.g. cooling passages where the surrounding metal temperature is higher.

Disk failures usually initiate at the bases of the grooves of the fir tree recess, or at the edge of the contact patch between the projections of the fir tree root and the fir tree recess. By deploying the cooling air more efficiently to these regions, it is possible to increase disk lifetimes.

The turbine disk and blade arrangement of the first aspect may have any one or, to the extent that they are compatible, any combination of the following optional features.

Preferably, the arrangement further has second lock plates which cover forward surfaces of the posts and of the fir tree roots and/or cover rearward surfaces of the posts and of the fir tree roots, the second lock plates and the posts defining collection channels therebetween which collect cooling air from the cooling passages, each collection channel extending from a respective cooling passage.

Like the first lock plates, the second lock plates allow the cooling air to be used more efficiently. For example, the collected cooling air can be guided by the collection channels to further locations requiring cooling, such as the tops of the posts. The collection channels can even redirect the cooling air back to the front of the disk, e.g. through further cooling passages formed by truncated fir tree projections.

Typically, the first lock plates cover the forward surfaces of the posts and of the fir tree roots. In this case, the second lock plates can cover the rearward surfaces of the posts and of the fir tree roots.

However, it is possible for lock plates covering the forward surfaces of the posts and of the fir tree roots to define feed channels which feed cooling air to a first portion of the cooling passages and also to define collection channels which collect cooling air from a second portion of the cooling passages, i.e. the lock plates can have a dual function. Likewise, it is possible for lock plates covering the rearward surfaces of the posts and of the fir tree roots to define feed channels which feed cooling air to the second portion of the cooling passages and also to define collection channels which collect cooling air from the first portion of the cooling passages. In this way, cooling air can flow simultaneously front to back and back to front through respective cooling passages.

Preferably, the faces of the first lock plates, and optionally the faces of the second lock plates, facing the posts have recesses formed therein corresponding to the paths of the channels, said faces of the lock plates contacting the respective surfaces of the posts around the perimeters of the recesses so that the recesses form the channels.

In this way, it is possible to modify the flow of cooling air by changing the configuration of the recesses provided by the lock plates rather than modifying relatively expensive items such as the disk and blades.

The recess can be formed e.g. by trenches in the faces of the lock plates or between raised walls on the faces of the lock plates.

On each pair of facing sides of the fir tree root and the fir tree recess, one or more projections of the fir tree root may be truncated to form respective fore-to-aft-extending first cooling passages between the facing sides, and one or more neighbouring projections of the fir tree recess may be truncated to form respective fore-to-aft-extending second cooling passages between the facing sides, the truncations being shaped so that neighbouring first and second cooling passages are connected to each other along respective fore-to-aft-extending openings.

Indeed, a further aspect of the present invention provides a turbine disk and blade arrangement for a gas turbine engine in which a plurality of turbine blades are mounted circumferentially around a disk, each blade having a fir tree root which provides on circumferentially spaced sides thereof a series of fore-to-aft-extending projections and grooves, and the disk having a plurality of circumferentially spaced, radially extending posts which define fir tree recesses therebetween, each fir tree recess also providing on circumferentially spaced sides thereof a series of fore-to-aft-extending projections and grooves, each fir tree root being slidable into a respective fir tree recess with the projections and grooves on facing sides of the fir tree root and the fir tree recess interengaging with each other;

wherein:
on each pair of facing sides of the fir tree root and the fir tree recess, one or more projections of the fir tree root are truncated to form respective fore-to-aft-extending first cooling passages between the facing sides, and one or more neighbouring projections of the fir tree recess are truncated to form respective fore-to-aft-extending second cooling passages between the facing sides, the truncations being shaped so that neighbouring first and second cooling passages are connected to each other along respective fore-to-aft-extending openings.

By connecting neighbouring first and second cooling passages to each other along the openings, further improved cooling of the fir tree roots and posts can be achieved. Also it can be possible to direct cooling air to just one of neighbouring first and second cooling passages (e.g. by an appropriate feed channel) but achieve cooling inside both of the passages.

Additionally, the truncations can produce significant weight reductions due to the reduction in metal required to form the posts and the fir tree roots.

The turbine disk and blade arrangement of the first or second aspect may have any one or, to the extent that they are compatible, any combination of the following optional features.

Preferably, the circumferentially spaced sides of the fir tree roots and/or the fir tree recesses carry an oxidation-resistant and/or sulphidation-resistant coating. For example, the coating can be a platinum or aluminised sulphidation-resistant coating.

Such coatings can significantly extent the lifetimes of the blades and disk, but can be difficult to apply given the usually close tolerances between the facing sides of the fir tree roots and fir tree recesses. However, particularly when the truncations are sized so that neighbouring first and second cooling passages are connected to each other along respective fore-to-aft-extending openings, larger surface areas of the facing sides may not be in direct contact with each other, allowing the coatings to be applied at least in these regions.

BRIEF DESCRIPTION OF THE DRAWINGS

Embodiments of the invention will now be described by way of example with reference to the accompanying drawings in which.

DETAILED DESCRIPTION

Figure 1:
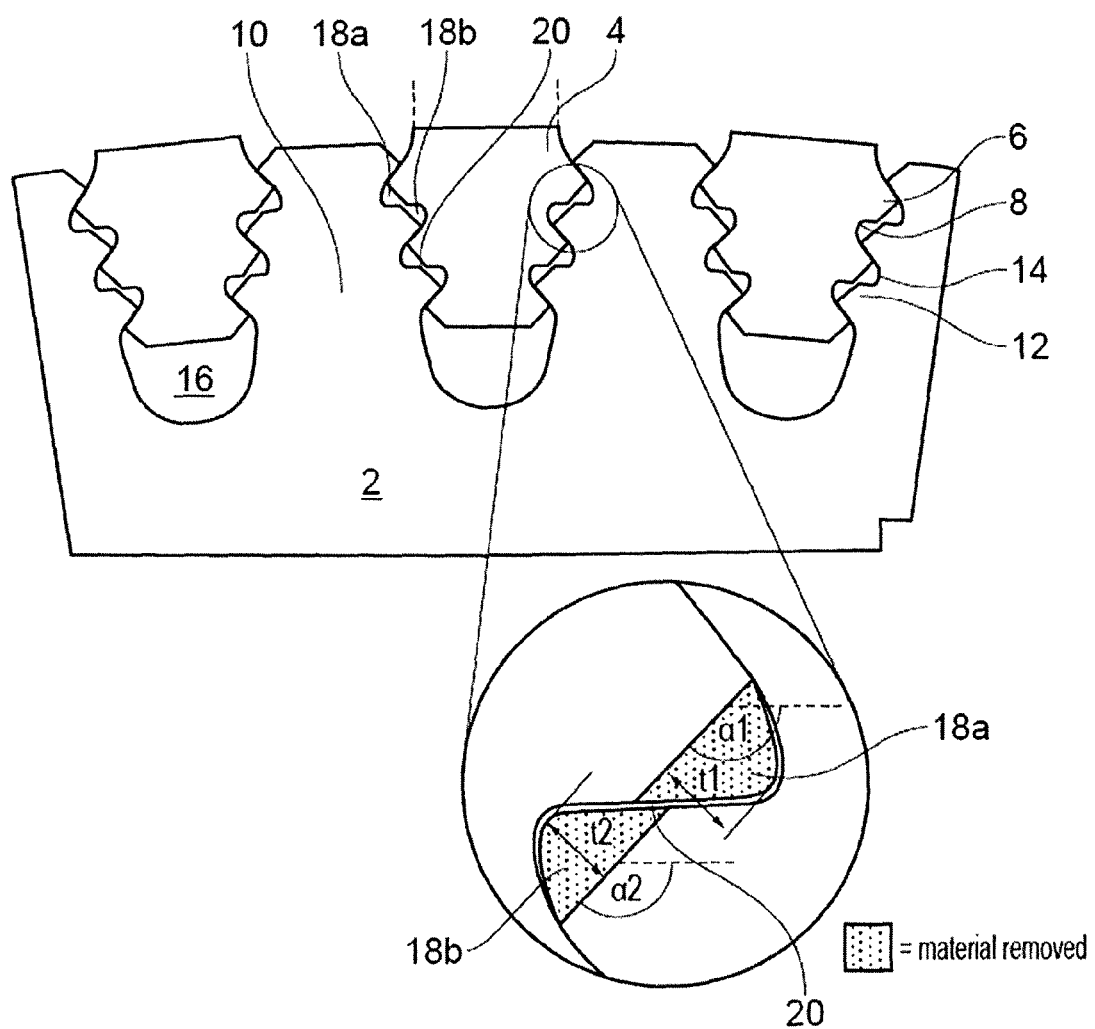
FIG. 1 shows schematically a front view of a part of a disk and the roots of three blades mounted to the disk.

FIG. 1 shows schematically a front view of a part of a disk 2 for a turbine section of a gas turbine engine. A row of circumferentially spaced turbine blades is mounted to the disk, the roots 4 of three of the blades being shown in FIG. 1. Each root is formed as a fir tree, tapering inwardly in width with increasing inwardly radial distance between circumferentially spaced sides, and with a series of fore-to-aft extending projections 6 and grooves 8 formed by the sides. The disk has circumferentially spaced, radially extending posts 10 between which are formed fir tree recesses. The sides of the recesses also form a series of fore-to-aft extending projections 12 and grooves 14.

To mount the blades to the disk 2, the roots 4 slide into the recess in the direction of extension of the projections 6, 12 and grooves 8, 14, with the projections on the sides of the roots fitting into the grooves on the sides of the recesses, and the projections on the sides of the recesses fitting into the grooves on the sides of the roots.

Spaces 16 are formed between the bases of the roots 4 and the bottoms of the recesses to receive cooling air bled from the compressor. This cooling air enters internal passages (not shown) in the roots and is conveyed radially outwardly to cool the airfoil sections of the blades.

The projections 6, 14 are truncated so that they do not completely fill the grooves into which they are fitted. This is illustrated in the close-up of two neighbouring projections shown in FIG. 1. The portions of the projections in the close-up which are more darkly shaded represent material that is absent due to the truncation of the projections. This absence of material provides cooling passages 18a from the truncated projection 6 and cooling passages 18b from the truncated projection 14, both sets of cooling passages extending from the forward to rearward sides of the disk. Like the spaces 16, the cooling passages also receive cooling air bled from the compressor, as discussed more fully below.

The respective angles $\alpha_1, \alpha_2$ of the surfaces 6a, 14a formed by the truncations can be varied, as can the respective depths $t_1, t_2$ of the truncations. However, preferably, the angles and depths are such that each pair of neighbouring cooling passages 18a, b are connected to each other via a fore-to-aft-extending opening 20. This opening can help to increase the circulation and hence the effectiveness of the cooling air in the neighbouring cooling passages.

The truncations also allow oxidation-resistant and/or sulphidation-resistant coating to be applied more easily to surfaces of the fir tree roots 4 and the recesses. In particular, the truncations reduce the total surface areas of the roots and recesses that are in close contact. That is, in the non-contacting areas the increased clearance between the roots and the recesses facilitates coating formation.

Figure 2:
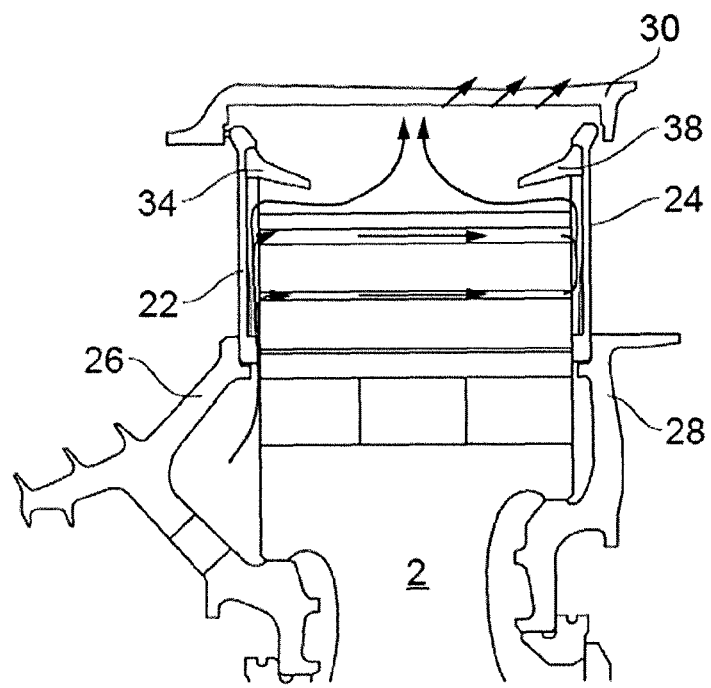
FIG. 2 shows a pattern of cooling air flow on a schematic longitudinal cross-section through the disk of FIG. 1 and the root of a blade mounted to the disk.
Figure 3:
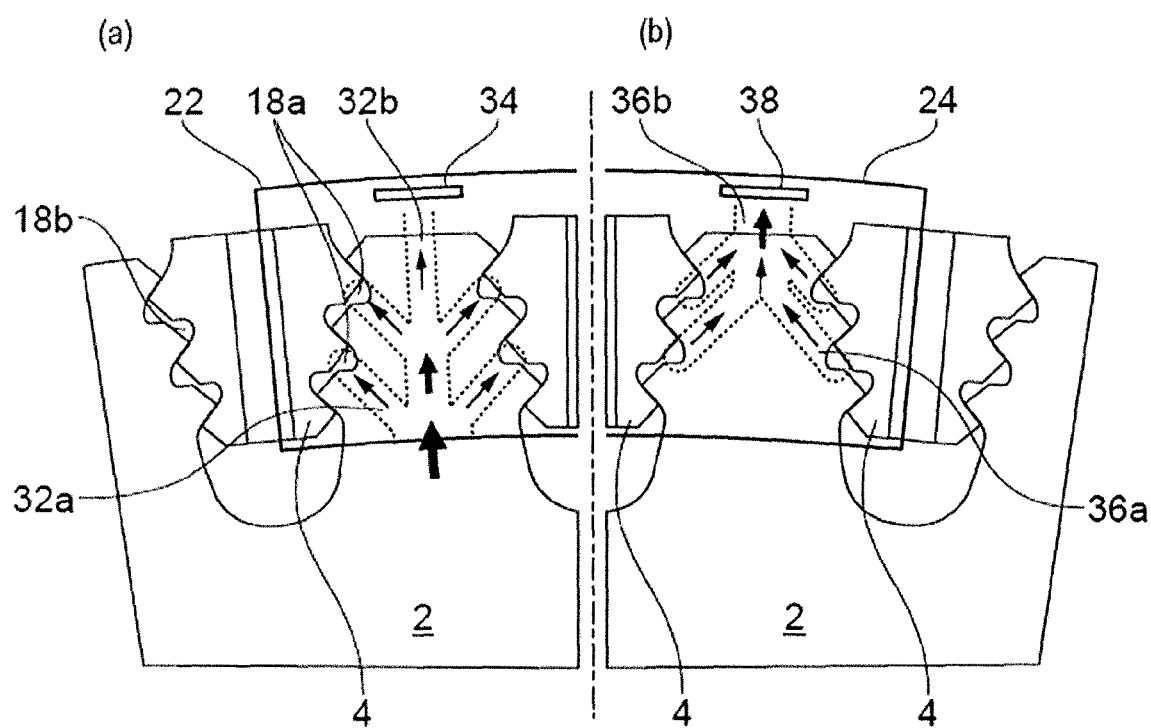
FIG. 3 shows the pattern of cooling air flow of FIG. 2 on (a) the front view of a part of the disk of FIG. 1, and (b) a schematic rear view of a part of the disk of FIG. 1.

FIG. 2 shows a pattern of cooling air flow on a schematic longitudinal cross-section through the disk 2 of FIG. 1 and the root 4 of a blade mounted to the disk, and FIG. 3 shows the pattern of cooling air flow on (a) the front view of a part of the disk, and (b) a schematic rear view of a part of the disk. In FIGS. 2 and 3 directions of cooling air flow are indicated by arrows.

As shown in FIGS. 2 and 3, the blades are retained axially in position by forward 22 and rearward 24 lock plates at respectively the forward and rearward sides of the disk 2. Each lock plate, which is approximately rectangular in shape, is centred on a respective post 10 and extends circumferentially on both sides of the post to about the midlines of the roots 4 of the neighbouring blades. The lock plates are held in position at their radially inward edges by forward 26 and rearward 28 disk rim cover plates, and at their radially outward edges by the blade platforms 30 of the neighbouring blades.

Each forward lock plate 22 has recesses formed in its face directed towards the disk 2. These recesses can be formed e.g. by trenches in the face of the lock plate or between raised walls on the face of the lock plate. When the lock plate is in position, the face presses against the substantially planar surface formed by the front of the post 10 and the front of the roots 4. The recesses thus form channels 32a, 32b for the flow of cooling air. As shown in FIG. 3(*a*), respective side channels 32a extend to each pair of neighbouring cooling passages 18a, b from a radially extending central channel 32b. This central channel receives at its inward end a flow of cooling air bled from the compressor. The side channels 32a then direct portions of the cooling air to their respective cooling passages. A further portion of the cooling air continues up the central channel and exits into a space between the top of the post and the blade platforms 30. It is there deflected on to the top surface of the post by a front deflector plate 34, and subsequently exits the space through apertures in or between the platforms.

The portions of cooling air directed to the cooling passages 18a, b flow through the passages to cool the surrounding metal of the posts 10 and roots 4. They then exit the passages at the rear of the disk. The rear lock plate has recesses in its face directed towards the substantially planar surface formed by the rear of the post 10 and the rear of the roots 4. The face presses against the planar surface, whereby the recesses form side channels 36a and a radially extending central channel 36b. The side channels collect the air flow exiting from the cooling passages and direct it to the central channel where it too exits into the space between the top of the post and the blade platforms 30. The collected air is deflected on to the top surface of the post by a rear deflector plate 38, and also exits the space through the apertures in or between the platforms.

Forming the channels 32a, 32b, 36a, 36b from recesses in the forward 22 and rearward 24 lock plates allows the channel configuration to be modified, should that be necessary, simply by changing the plates. The relatively expensive disk 2 and blades do not need to be altered. Further, compared to the arrangement of US 2004/0191067 in which cooling air is simply introduced into a space infront of the fir tree roots, the channels allow the cooling air to be partitioned between the cooling passages 18a, b more accurately and directed thereto more efficiently. For example, cooling schemes can be implemented in which e.g. some cooling passages receive most of the cooling is air flow at the expense of other passages, or cooling air is returned by the rearward lock plate through cooling passages to the front of the disk to provide an interlacing cooling flow in the cooling passages around the roots 4.

Figure 4:
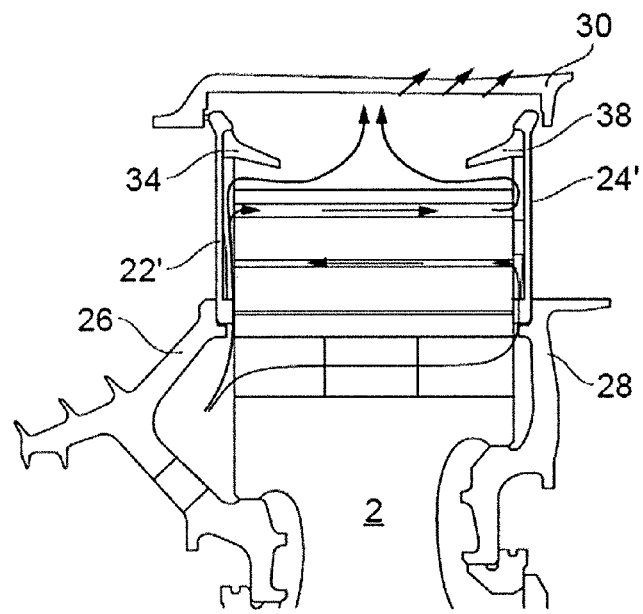
FIG. 4 shows a further pattern of cooling air flow on the schematic longitudinal cross-section through the disk of FIG. 1 and the root of a blade mounted to the disk.
Figure 5:
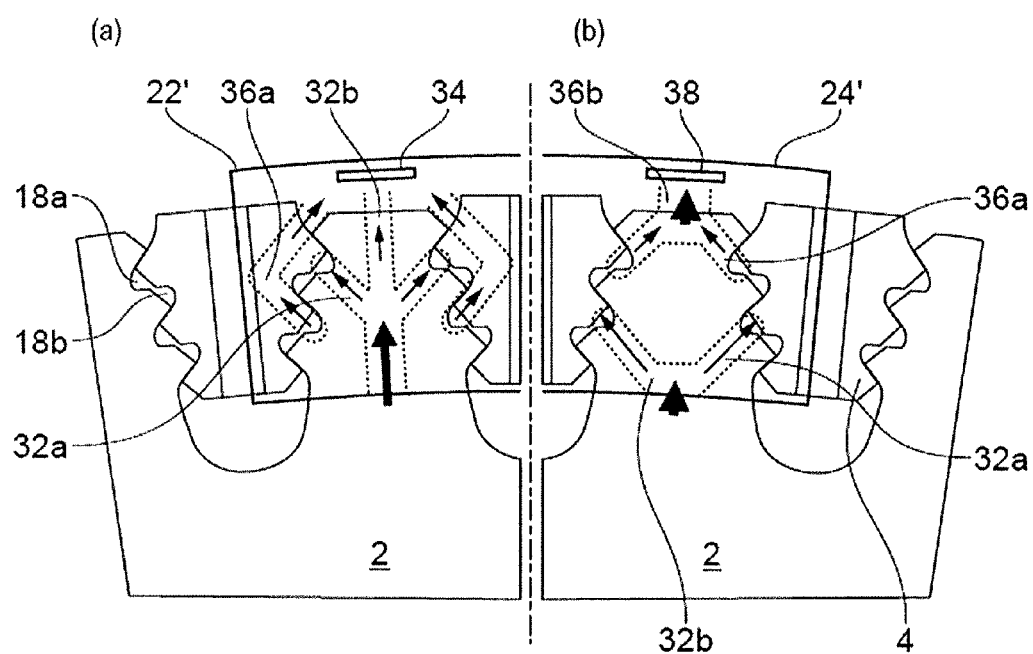
FIG. 5 shows the pattern of cooling air flow of FIG. 4 on (a) the front view of a part of the disk of FIG. 1, and (b) the rear view of a part of the disk of FIG. 1.

FIG. 4 shows a different pattern of cooling air flow on the schematic longitudinal cross-section through the disk 2 of FIG. 1 and the root 4 of a blade mounted to the disk, and FIG. 5 shows the different pattern of cooling air flow on (a) the front view of a part of the disk, and (b) the rear view of a part of the disk. In FIGS. 4 and 5 directions of cooling air flow are indicated by arrows. Corresponding features having the same reference numbers in FIGS. 4 and 5 and they do in FIGS. 2 and 3.

The different pattern of cooling air flow allows the cooling air to flow simultaneously front to back and back to front through respective pairs of neighbouring cooling passages 18a, b, rather than solely front to back as in FIGS. 2 and 3. This different pattern is achieved simply by replacing the forward 22 and rearward 24 lock plates of FIGS. 2 and 3, with forward 22' and rearward 24' lock plates having altered arrangements of recesses.

In particular, each forward lock plate has recesses defining a central, radially extending channel 32b' and side channels 32a' extending therefrom to direct portions of the cooling air to respective (first) cooling passages. However, the forward lock plate also has dog-leg-shaped recesses defining side channels 36a' which collect cooling air from other respective (second) cooling passages and send the collected cooling air into the space between the top of the post and the blade platforms 30.

Further, each rearward lock plate has recesses defining side channels 36a' and a radially extending central channel 36b'. The side channels collecting the air flow exiting from the first cooling passages and direct it to the central channel where it too exits into the space between the top of the post and the blade platforms 30. However, the rearward lock plate also has recesses defining a central, radially extending channel 32b' and side channels 32a' extending therefrom to direct portions of the cooling air to the second cooling passages. The cooling air flow arrives at the central, radially extending channel 32b' of the rearward lock plate via the space 16 formed between the base of the root 4 and the bottom of the corresponding recess.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A turbine disk and blade arrangement for a gas turbine engine in which a plurality of turbine blades are mounted circumferentially around a disk, each blade having a fir tree root which provides on circumferentially spaced sides thereof a series of fore-to-aft-extending projections and grooves, and the disk having a plurality of circumferentially spaced, radially extending posts which define fir tree recesses therebetween, each fir tree recess also providing on circumferentially spaced sides thereof a series of fore-to-aft-extending projections and grooves, each fir tree root being slidable into a respective fir tree recess with the projections and grooves on facing sides of the fir tree root and the fir tree recess interengaging with each other;

wherein on each pair of facing sides of the fir tree root and the fir tree recess, one or more of the projections of the fir tree roots and/or the fir tree recesses are truncated to form fore-to-aft-extending cooling passages between facing sides of the fir tree roots and fir tree recesses, and the arrangement has lock plates which cover forward surfaces of the posts and of the fir tree roots and/or cover rearward surfaces of the posts and of the fir tree roots, the lock plates and the posts defining feed channels therebetween which feed cooling air to the cooling passages, the feed channels are partitioned such that each cooling passage extends to a respective feed channel.

2. A turbine disk and blade arrangement according to claim 1, wherein the arrangement further has further lock plates which cover forward surfaces of the posts and of the fir tree roots and/or cover rearward surfaces of the posts and of the fir tree roots, the further lock plates and the posts defining collection channels therebetween which collect cooling air from the cooling passages, each collection channel extending from a respective cooling passage.

3. A turbine disk and blade arrangement according to claim 1, wherein the lock plates defining feed channels cover the forward surfaces of the posts and of the fir tree roots, and the lock plates defining collection channels cover the rearward surfaces of the posts and of the fir tree roots.

4. A turbine disk and blade arrangement according to claim 1, wherein the faces of the lock plates facing the posts have recesses formed therein corresponding to the paths of the channels, said sides of the lock plates contacting the respective surfaces of the posts around the perimeters of the recesses so that the recesses form the channels.

5. A turbine disk and blade arrangement according to claim 1 wherein, on each pair of facing sides of the fir tree root and the fir tree recess, one or more projections of the fir tree root are truncated to form respective fore-to-aft-extending first cooling passages between the facing sides, and one or more neighbouring projections of the fir tree recess are truncated to form respective fore-to-aft-extending second cooling passages between the facing sides, the truncations being shaped so that neighbouring first and second cooling passages are connected to each other along respective fore-to-aft-extending openings.

6. A turbine disk and blade arrangement according to claim 1, wherein the circumferentially spaced sides of the fir tree roots and/or the fir tree recesses carry an oxidation-resistant and/or sulphidation-resistant coating.

7. A turbine disk and blade arrangement according to claim 6, wherein the circumferentially spaced sides of the fir tree roots and/or the fir tree recesses carry a platinum or aluminised sulphidation-resistant coating.

8. A turbine disk and blade arrangement for a gas turbine engine in which a plurality of turbine blades are mounted circumferentially around a disk, each blade having a fir tree root which provides on circumferentially spaced sides thereof a series of fore-to-aft-extending projections and grooves, and the disk having a plurality of circumferentially spaced, radially extending posts which define fir tree recesses therebetween, each fir tree recess also providing on circumferentially spaced sides thereof a series of fore-to-aft-extending projections and grooves, each fir tree root being slidable into a respective fir tree recess with the projections and grooves on facing sides of the fir tree root and the fir tree recess interengaging with each other;

wherein on each pair of facing sides of the fir tree root and the fir tree recess, one or more projections of the fir tree root are truncated to form respective fore-to-aft-extending first cooling passages between the facing sides, and one or more neighbouring projections of the fir tree recess are truncated to form respective fore-to-aft-extending second cooling passages between the facing sides, the truncations being shaped so that neighbouring first and second cooling passages are connected to each other along respective fore-to-aft-extending openings.

9. A turbine disk and blade arrangement according to claim 8, wherein the circumferentially spaced sides of the fir tree roots and/or the fir tree recesses carry an oxidation-resistant and/or sulphidation-resistant coating.

10. A turbine disk and blade arrangement according to claim 9, wherein the circumferentially spaced sides of the fir tree roots and/or the fir tree recesses carry a platinum or aluminised sulphidation-resistant coating.

11. A turbine disk and blade arrangement according to claim 1, wherein the partitioning of the flow channels allows simultaneous aft-to-fore and fore-to-aft flow through respective cooling passages.

\* \* \* \* \*